PROCESS FOR ELECTRODEPOSITION OF ANISOTROPIC MAGNETIC FILMS AND A PRODUCT FORMED BY THE PROCESS

Filed May 22, 1967

INVENTOR.
IRVING W. WOLF
BY Robert S. Clay
ATTORNEY

United States Patent Office 3,524,173
Patented Aug. 11, 1970

3,524,173

PROCESS FOR ELECTRODEPOSITION OF ANISOTROPIC MAGNETIC FILMS AND A PRODUCT FORMED BY THE PROCESS

Irving W. Wolf, Palo Alto, Calif., assignor to Ampex Corporation, Redwood City, Calif., a corporation of California.

Filed May 22, 1967, Ser. No. 639,953
Int. Cl. G11c *11/14*
U.S. Cl. 340—174 6 Claims

ABSTRACT OF THE DISCLOSURE

A process for improving the quality of a magnetic film formed on a thick conductive substrate wherein a fine grain, nonmagnetic material is first deposited on the substrate and then the magnetic film is formed on the nonmagnetic material. The product formed comprises two magnetic films containing therebetween the fine grain, nonmagnetic material, which defines thus a sandwich structure wherein the film deposited on the nonmagnetic material is a high quality, thin magnetic film having low dispersion properties and which is acceptable for use in large, fast memory systems.

The invention herein described was made in the course of a contract with the Department of United States Air Force.

BACKGROUND OF THE INVENTION

It is well known in the art that a severe limitation on bit densities which may be achieved with an open flux magnetic film memory element is imposed in film memories by a phenomenon known as creep. Creep occurs in a memory element under a combination of unfavorable conditions. Generally, the superposition of a digit drive field, stray field from an adjacent word drive, and possible stray flux from adjacent bits may coincidently occur in a direction which tends to disturb a written bit. Under such conditions, a reversal of magnetization may occur in the element after it has been exposed to repeated pulses of the adjacent word drive. The number of pulses may be quite large such as on the order of several thousand before significant disturb occurs.

It is also known that severity of the creep disturb phenomena is drastically reduced when the film thickness is approximately 400 A. or less. This thickness threshold is the same as that for the establishment of Neel domain walls rather than cross-tie walls in films. Thus, the creep resistance is believed to be due to the fact that Neel walls cannot be made to creep as readily as cross-tie walls. However, due to the fact that the wall coercive forces are somewhat different in the two cases and that the self-demagnetizing effects are not the same, no definite mechanism for a creep resistance of the thinner films has been established.

Since it is thus highly advantageous to prepare memory elements of 400 A. thickness or less, it becomes necessary either to accept the smallest signal output which results from using thinner films or to devise an alternate structure which makes use of the Neel wall structure but is comparable to thicker film in output.

Thin magnetic films when electrodeposited onto thick or large grained conducting substrates in the past have been found to be of poor quality, in that they had very large easy access dispersion when the films were of the order of 1,000 A. or less in thickness. The poor quality of the prior art thin films has been attributed to the fact that a good deal of interaction takes place between the crystals in the metallic substrate and the atoms deposited onto the substrate. Thus, crystalline anisotropy is reported to play some role in increasing dispersion. In addition, it is well known that microscopic roughness of substrates generally leads to dispersion. Since it is very difficult to achieve a microscopically smooth surface on a "metallurgically prepared" metal, the deposition of good magnetic thin fims on such surfaces has been impossible.

In the present state of the art, sandwich or bicore constructions for magnetic film storage elements have been fabricated predominantly by an evaporation procedure. This procedure requires first that a magnetic film material, such as, for example, permalloy, be evaporated onto a substrate and thereafter photo-etched. Second, a silicon monoxide separator film is then evaporated onto the magnetic film. Third, a second permalloy film is evaporated onto the silicon monoxide film and subsequently photo-etched to provide patterns on the two permalloy films which are nearly perfectly aligned. The double photo-etch step and the critical alignment of the pattern results in problems which have made this an undesirable procedure.

Accordingly, to provide a sandwich structure in prior art devices, wherein the magnetic films deposited are of sufficiently high quality for use in fast, large magnetic memories, various intermediate layer materials have been utilized. However, the results are generally unsatisfactory due to the difficulty of photo-etching the sandwich configuration in a single step process, which would be a highly desirable improvement. The properties required of the intermediate layer material are that it must be conductive, nonmagnetic, photo-etchable with an etchant which would not severely undercut the permalloy, and sufficiently fine grained such that a low dispersion, high quality magnetic film may be superimposed upon the material.

SUMMARY OF THE INVENTION

The present invention provides a process, and a group of materials, for depositing a material taken from the group, to define a fine grain, nonmagnetic, intermediate layer of the order of, for example, 2000 to 4000 A. thick, wherein the process utilizes only a single photo-etch step. By way of definition, fine grain is intended herein as a grain size equal to or less than a domain wall width of the associated magnetic film material. The intermediate layer effects a microscopic "smoothing" of any material used as a substrate, such that when a magnetic film is deposited onto the smoothing layer it is sufficiently isolated from the effects of the substrate material to greatly improve the magnetic characteristics of the deposited magnetic film. The resulting film has the well-defined anisotropy and low dispersion characteristics of conventional high quality magnetic films, which films are presently obtained only by depositing them on smooth surfaces such as glass. The capability of producing high quality magnetic films directly on (conductor) substrate materials leads to an enormous relaxation of the complexity of fabricating closed flux or sandwich thin magnetic film structures.

The resulting sandwich structure, which may be realized utilizing the process of the invention, allows the fabrication of very thin magnetic films of the order of, for example, 400 A. or less, in the case of permalloy material. The films exhibit Neel type magnetic domain boundaries rather than the usual cross-tie walls found in thicker films, and still permit the fabrication of layered structures having a sufficient total magnetic film thickness such that reasonable signal outputs can be realized. The invention provides a process and a resulting product which can be achieved comparatively simply since it requires only a single photo-etch step to provide the advantageous sandwich structure.

DESCRIPTION OF THE PREFERRED EMBODIMENTS

Figure 1:
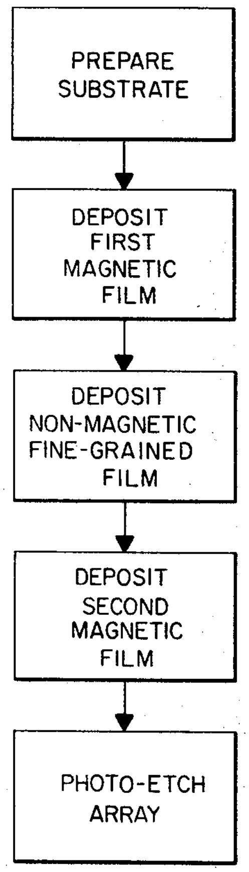
FIG. 1 is a schematic diagram depicting in block form the various steps of the invention process for preparing the storage elements of FIGS. 1 and 2.

Referring to FIG. 1, there is shown in simplified block form a schematic of the steps employed in performing the process of the invention. Referring in addition to a storage element 10 shown in FIG. 2, a substrate 12 formed of the usual material such as glass, polyester film, or metal, is prepared to receive a first magnetic film 14. If the magnetic film 14 is to be electrodeposited, the substrate 12, when formed of glass or polyester film material, has a conductive layer 15 deposited thereon by a conventional sputtering or evaporating process. When utilizing a substrate 12 formed of a metallic material, the need for a conductive layer is precluded. After the substrate 12 is prepared, it is placed in a conventional plating solution and the magnetic film 14 is deposited thereon by electrodeposition as depicted by step 2 of the process. In step 3 the substrate 12 and film 14 are placed in a selected bath solution and a nonmagnetic film 16 of selected thickness and having a grain size equal to or less than a domain wall width of the associated magnetic film material, is deposited thereon. Finally, in step 4, a second magnetic film 18 is electrodeposited onto the nonmagnetic fine grain film 16.

Figure 5:
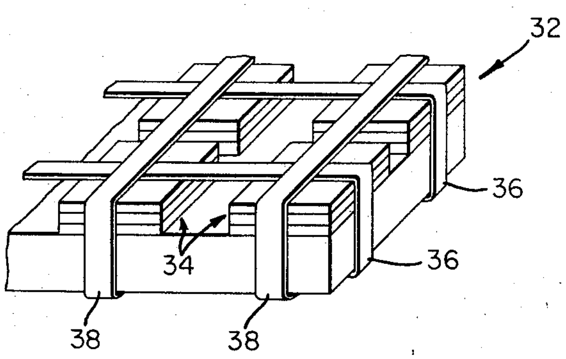
FIG. 5 is a perspective view of a portion of a memory array utilizing the storage elements of the invention.

The resulting sandwich structure is then photo-etched as depicted by step 5, using generally conventional photoresist procedures and the usual ferric chloride etchant. However, in using this etchant, some nickel phosphide remains. In order to remove this generally harmless film, the structure is dipped in diluted nitric acid while the photo-resist is still present. Upon completion of the photoetch process there remains, in accordance with the invention, a substrate having formed thereon a plurality of spaced "spots" or sandwich storage elements, as is shown in FIG. 5, wherein the configuration is then used to form the storage components of a memory system.

By way of example only, the preferred process of the invention utilizes a nickel-phosphorus material as the nonmagnetic fine grain film 16. Accordingly, the associated bath for the nickel-phosphorus plating procedure is formed of a solution containing nickel ions and phosphorus compounds such as the hypophosphite ion. It is desirable that the concentration of the hypophosphite ion be sufficiently high such that the film produced does not exhibit ferromagnetism at room temperature. The phosphorus content in the film required to eliminate the presence of ferromagnetism is approximately 10% but for the purposes herein described the phosphorus content in the nickel-phosphorus film 16 may be considerably more than this.

The nickel-phosphorus film may be deposited for example from both sulphate and sulphamate baths using sufficiently high hypophosphite ion content to produce a nonmagnetic film. By way of example, the following Tables I and II give the composition of a nickel-sulphamate bath and a sulphate chloride bath respectively, by which the nickel-phosphorus film may be deposited.

TABLE I 500 ml./liter stock nickel sulfamate (Hansen, Van Winkle & Munning) 47% bolmac
20 gr./liter $H_3BO_3$ (boric acid)
25 gr./liter NaCl
0.2 gr./liter sodium laurel sulfate
1.5 gr./liter sodium disulfonate 5 gr./liter saccharin
Variable amount of sodium hypophosphite, e.g., 10 to 50 gr./liter

TABLE II 250 gr./liter $NiSo_4 \cdot 7H_2O$
25 gr./liter $H_3BO_3$ (boric acid)
25 gr./liter NaCl
0.1 gr./liter sodium laurel sulfate
1.5 gr./liter sodium disulfonate
5 gr./liter saccharin
Variable amount of sodium hypophosphite, e.g., 10 to 50 gr./liter It was found that a nonmagnetic layer or film 16 is produced with 20 grams per liter of sodium hypophosphite. concentration may comprise 30 grams per liter.

Figure 2:
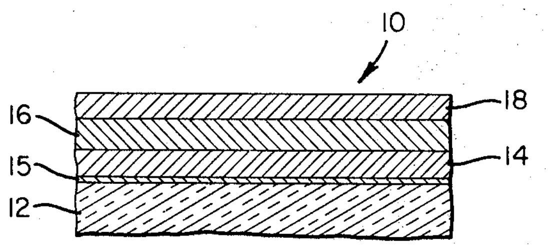
FIGS. 2, 3, and 4 are cross-sectional views of various embodiments of sandwich storage elements in accordance with the invention.
Figure 3:
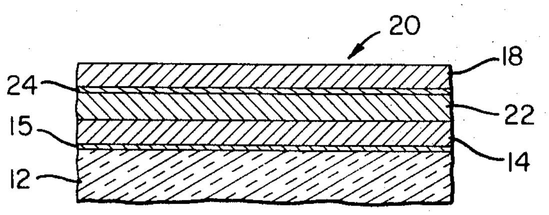

Referring now to FIG. 3 there is shown an alternative embodiment of a storage element 20 of the invention comprising as in FIG. 2 a substrate 12 and two magnetic layers 14 and 18. However, the nonmagnetic layer 16 has been replaced by a first layer 22 of a material of any of the well-known nonmagnetic materials which are fine gained and etchable, and a nonmagnetic fine gain layer 24, of, for example, a nickel-phosphorus material such as used to form layer 16 of FIG. 2, which is then deposited upon the layer 22.

Figure 4:
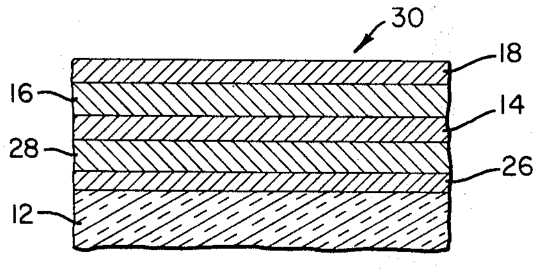

As known in the art, low dispersion, electrodeposited magnetic films have been prepared on sputtered gold substrates. Likewise, it is known that the dispersion is dependent on the crystallite size of the gold layer, and thus, in order to obtain very low dispersion it is necessary to limit the thickness of the gold to approximately 200 A. This, in turn, however, causes sizeable resistances in the gold conductive layer during electrodeposition. Thus, as may be seen from FIG. 4, the process of the invention provides means for overcoming the substrate resistance problem by application of the intermediate layer of nonmagnetic fine grain material. Thus, the invention contemplates the use of the nonmagnetic material as a "smoothing" layer which is deposited on a thicker than normal, hence coarser grain, sputtered gold layer. To this end, as shown in FIG. 4, a substrate 12 is prepared by depositing thereon a thick layer 26 of gold, of the order of, for example, 1,000 A. thick. Thereafter, a nickel-phosphorus film 28 is electro-deposited as previously described onto the gold layer 26 to provide a smooth surface for deposition thereon of the low dispersion magnetic film 14. Then the subsequent nickel-phosphorus film 16 and the magnetic film 18 is deposited as in the storage element 10 of FIG. 2. The layer 28 of nickel-phosphorus nonmagnetic material may be of the order of, for example 2,000 A. thickness.

The process of the invention thus makes possible the fabrication of a memory array 32 utilizing the sandwich structure of the type shown in FIG. 2, wherein by way of example only, the multi-layered storage element 10 is photo-etched to form individual rectangular bits 34. The bits may be, for example, 0.010 in. by 0.060 in. in size. The memory array 32 is provided with transverse field drive lines 36 and 38 disposed orthogonally to each other adjacent to and in register with the rows of elements as shown in FIG. 5, whereby application of fields to the rectangular bits 34 for purposes of storage and readout are accomplished in the conventional manner.

It is found that when the magnetic film 14 and 18 are made sufficiently thin, as for example, 400 A. or less for zero magnetostriction permalloy, improved creep disturb resistance results for the finished structure when used in word organized memory systems, yet the total magnetic film thickness in the structure may be as thick as 800 A. or approximately twice the allowable limit for a single film.

It is preferable that the nonmagnetic separating film, e.g., 16, 22–24, 28 be sufficiently thick such that interaction between domain walls in the adjacent magnetic layers 14, 18 does not occur. Usual separations between the magnetic films of the order of 2,000 A. is found to be sufficiently large to prevent the interaction.

Although the invention process and product has been described herein with reference to several particular embodiments, it is to be understood that various modifications may be made thereto within the spirit of the invention, and thus it is not intended to limit the invenion except as defined in the following claims.

I claim:

1. A process for depositing an anisotropic thin magnetic film of thickness less than 5,000 angstroms onto a thick large grain substrate including an electrically conductive surface comprising the steps of:

placing the thick large grain substrate with the electrically conductive surface in a bath solution having a predetermined ionic content of a selected smoothing film material to be deposited to produce a nonmagnetic fine grain film by the electrodeposition process;

electrodepositing a smoothing film of the fine grain nonmagnetic material having a grain size less than a domain wall width of the associated magnetic film material on the substrate; and depositing said anisotropic thin magnetic film of thickness less than 5,000 angstroms on said smoothing film.

2. The process of claim 1 wherein said fine grain nonmagnetic material is taken from the group of materials consisting of nickel-phosphorus, chromium, non-magnetic nickel-chromium, and rhodium.

3. The process of claim 1 further comprising the step of preparing the surface of the substrate to provide a smooth surface capable of receiving a low dispersion high quality magnetic film of less than 5,000 angstroms thickness.

4. A process for forming a thin magnetic film sandwich storage element of a first and a second thin magnetic film, comprising the steps of:

preparing a smooth electrically conductive surface on said substrate;

electrodepositing said first magnetic film with a thickness less than 5,000 angstroms onto said substrate;

electrodepositing a fine grain nonmagnetic material having a grain size less than a domain wall width of the associated magnetic film material onto said first magnetic film; and electrodepositing said second magnetic film with a thickness less than 5,000 angstroms onto said fine grain nonmagnetic material.

5. The process of claim 4 wherein a plurality of storage elements are formed to define a memory system further including the step of, photo-etching in a single step the resulting sandwich structure to define said plurality of storage elements, wherein said first and second thin magnetic films of each element are separated by said fine grain nonmagnetic material.

6. An improved all-metallic sandwich storage element comprising:

a substrate having at least a conductive surface;

a first thin magnetic film of thickness less than 5,000 angstroms disposed on said substrate;

a film of fine grain nonmagnetic material of selected thickness and having a grain size less than a domain wall width of the associated magnetic film material disposed on said first magnetic film; and a second thin magnetic film of thickness less than 5,000 angstroms disposed on said nonmagnetic material film.

References Cited

UNITED STATES PATENTS

| | | | |
|---|---|---|---|
| 2,853,402 | 9/1958 | Blois | 117—71 |
| 3,191,162 | 6/1965 | Davis | 340—174 |
| 3,252,152 | 5/1966 | Davis et al. | 340—174 |
| 3,305,845 | 2/1967 | Grace et al. | 340—174 |

STANLEY M. URYNOWICZ, Jr., Primary Examiner

U.S. Cl. X.R.

117—71; 204—41